United States Patent
Guillemin et al.

(10) Patent No.: US 7,120,605 B2
(45) Date of Patent: Oct. 10, 2006

(54) SYSTEMS AND METHODS FOR SECURE PRINTING

(75) Inventors: Gustavo M. Guillemin, Guadalajara (MX); Shawn Rosti, Boise, ID (US); Laura I. Reardon, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1038 days.

(21) Appl. No.: 09/728,045

(22) Filed: Nov. 30, 2000

(65) Prior Publication Data

US 2002/0065729 A1 May 30, 2002

(51) Int. Cl.
*G06F 17/60* (2006.01)

(52) U.S. Cl. ............... 705/62; 705/51; 705/408; 705/410

(58) Field of Classification Search ............ 705/51, 705/60, 62, 63, 64, 67, 408–411
See application file for complete search history.

(56) References Cited

U.S. PATENT DOCUMENTS

| | | | | |
|---|---|---|---|---|
| 5,774,879 A | * | 6/1998 | Custy et al. ............... | 705/35 |
| 6,307,640 B1 | * | 10/2001 | Motegi ............... | 358/1.14 |
| 6,406,120 B1 | * | 6/2002 | Pauschinger ............... | 347/19 |
| 2001/0016912 A1 | | 8/2001 | Takahashi | |

FOREIGN PATENT DOCUMENTS

| | | |
|---|---|---|
| EP | 0944239 A1 | 9/1999 |
| EP | 0949806 A2 | 10/1999 |
| GB | 2350713 A | 12/2000 |
| JP | 408164639 A * | 6/1996 |
| JP | 10235974 A | 2/1997 |
| JP | 2000172478 | 12/1998 |
| WO | WO 02/41133 | 5/2002 |

OTHER PUBLICATIONS

IBM Technical Disclosure Bulletin, Jan. 1991, US Method for Automatically Printing Variable Content Labels On–line.*

* cited by examiner

*Primary Examiner*—Pierre E. Elisca

(57) ABSTRACT

A preferred printing system includes a printer configured to communicatively couple with a workstation, which incorporates a first code entry device for receiving first coding information from a user. The printer incorporates a second code entry device that is configured to receive second coding information from the user. Additionally, the printer is configured to print data in response to correlating the first coding information received at the first code entry device with the second coding information received at the second code entry device. Devices, methods and computer readable media also are provided.

22 Claims, 5 Drawing Sheets

FIG. 5

PRINT

PRINTER
STATUS
TYPE
WHERE
COMMENT

PROPERTIES

PAGE RANGE
○ ALL
○ CURRENT PAGE
○ SELECTION
○ PAGES:

COPIES
NUMBER OF COPIES

PRINT WHAT
DOCUMENT

PRINT: ALL PAGES IN RANGE

OPTIONS

SECURE — 510
OK
CANCEL

SYSTEMS AND METHODS FOR SECURE PRINTING

BACKGROUND OF THE INVENTION

1. Field of the Invention

The present invention generally relates to printers and, in particular, to systems and methods for providing secure printing while utilizing printers remote from the workstations from which the printing was requested.

2. Description of the Related Art

The proliferation of computer networking has rendered it commonplace for a user to enter, download and/or, otherwise, utilize information at a workstation, and then, when the information is designated to be printed, print the information at a site remote from that workstation. Oftentimes, however, the nature of the data to be printed lends itself to being printed in a secure environment where the ability of someone other than the user to retrieve the printed data should be minimized. Heretofore, in order to ensure that someone other than the user is unable to retrieve the user's printed document(s) from a printer, the user typically must request that data be printed, such as by the use of a typical printer driver, and then walk to the printer so that no one else is able to retrieve the printed document. However, if the user is unable to be available at the printer prior to the document being printed, the printed document may be retrieved by someone other than the user.

Therefore, there is a need for improved systems and methods which address these and other shortcomings of the prior art.

SUMMARY OF THE INVENTION

Briefly described, the present invention relates to devices, systems and methods for providing secure printing. In a preferred embodiment, the present invention provides a printing system for use with a workstation that incorporates a first code entry device for receiving first coding information from a user. The printing system includes a printer configured to communicatively couple with the workstation and the printer incorporates a second code entry device that is configured to receive second coding information from the user. Additionally, the printer is configured to print data in response to correlating the first coding information received at the first code entry device with the second coding information received at the second code entry device.

In an alternative embodiment, a printing security system is provided. The printing security system includes a first code entry device configured to communicatively couple with a workstation and a second code entry device configured to communicatively couple with a printer. The first code entry device also is configured to receive first coding information from the user and provide the first coding information to the workstation, and the second code entry device also is configured to receive second coding information from the user and provide the second coding information to the printer so that the printer is enabled to print data in response to the first coding information corresponding to the second coding information.

Some embodiments of the present invention may be construed as providing methods for providing secure printing between a workstation and a printer. In this regard, a preferred method includes the steps of: receiving first coding information, at the workstation, from a user; enabling print data and the first coding information to be transmitted to the printer; receiving second coding information, at the printer, from the user; comparing the first coding information with the second coding information; and, if the first coding information corresponds to the second coding information, enabling printing of the print data at the printer.

Additionally, some embodiments of the present invention may be construed as providing computer readable media which incorporate computer programs for providing secure printing between a workstation and a printer. In this regard, a preferred computer readable medium includes: logic configured to receive first coding information, at the workstation, from a user; logic configured to receive second coding information, provided at the printer, from the user; logic configured to compare the first coding information with the second coding information; and logic configured to enable printing of the print data at the printer if the first coding information corresponds to the second coding information.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

FIG. 5 is a schematic diagram depicting a representative user interface for a printer driver utilized in a preferred embodiment of the present invention.

DETAILED DESCRIPTION OF A PREFERRED EMBODIMENT

Figure 1:
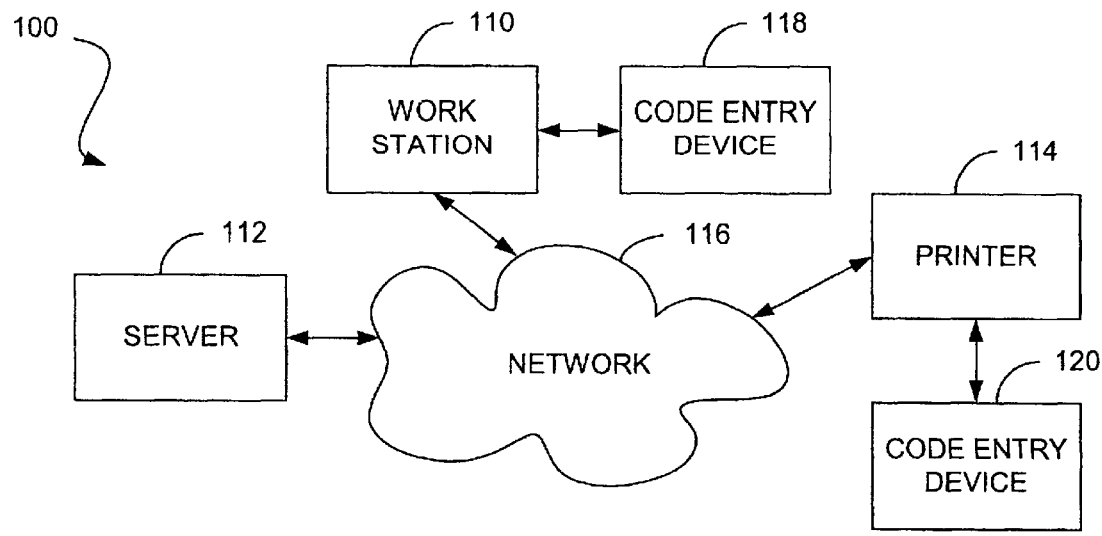
FIG. 1 is a schematic diagram of a preferred embodiment of the present invention.

Reference will now be made in detail to the description of the invention as illustrated in the drawings with like numerals indicating like parts throughout the several views. As depicted in FIG. 1, a representative computer network 100 includes a workstation 110, a server 112 and a printer 114 that are adapted to intercommunicate via a network 116, such as the internet, intranet, ethernet, local area network, etc. So configured, an operator is able to request that information be printed by sending a print request, via the network and associated server, to printer 114.

As mentioned briefly hereinbefore, oftentimes it is desired that the documents requested to be printed by a user only be made available to the user, thus providing a secure printing function to that user. In this regard, workstation 110 and printer 114 may be provided with code entry devices, e.g., 118 and 120 respectively. The code entry devices may be adapted to receive user-specific coding information such as physiological pattern information, e.g., finger print data, or other user-specific coding information. So provided, when a user requests information to be printed, the user may select a secure printing mode or function of the present invention, whereby the user may enter user-specific coding information at the workstation from which the print request originated.

Thereafter, although the information may be forwarded to an appropriate printer for printing, the information to be printed may be enqueued or, otherwise, maintained in memory, until the user requesting the printing provides appropriately corresponding user-specific coding information at the printer. Thus, if the user is unavailable to retrieve a printed document at the printer when it would, otherwise, already have been printed in accordance with the printer's enqueuing protocol, preferred embodiments of the present invention ensure that the document will only be printed when the user-specific coding information is provided at the printer. So configured, the present invention helps ensure that the user is available at the printer to retrieve the printed document.

As mentioned hereinbefore, some embodiments of the present invention may be construed as providing secure printing systems, which may be implemented in hardware, software, firmware, or a combination thereof. In a preferred embodiment, however, the system is implemented as a software package, which can be adaptable to run on different platforms and operating systems as shall be described further herein. More specifically, a preferred embodiment of the secure printing system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this document, a "computer-readable medium" can be any means that can contain, store, communicate, propagate or transport the program for use by or in connection with the instruction execution system, apparatus, or device. The computer readable medium can be, for example, but is not limited to, an electronic, magnetic, optical, electromagnetic, infrared, or semi-conductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 2:
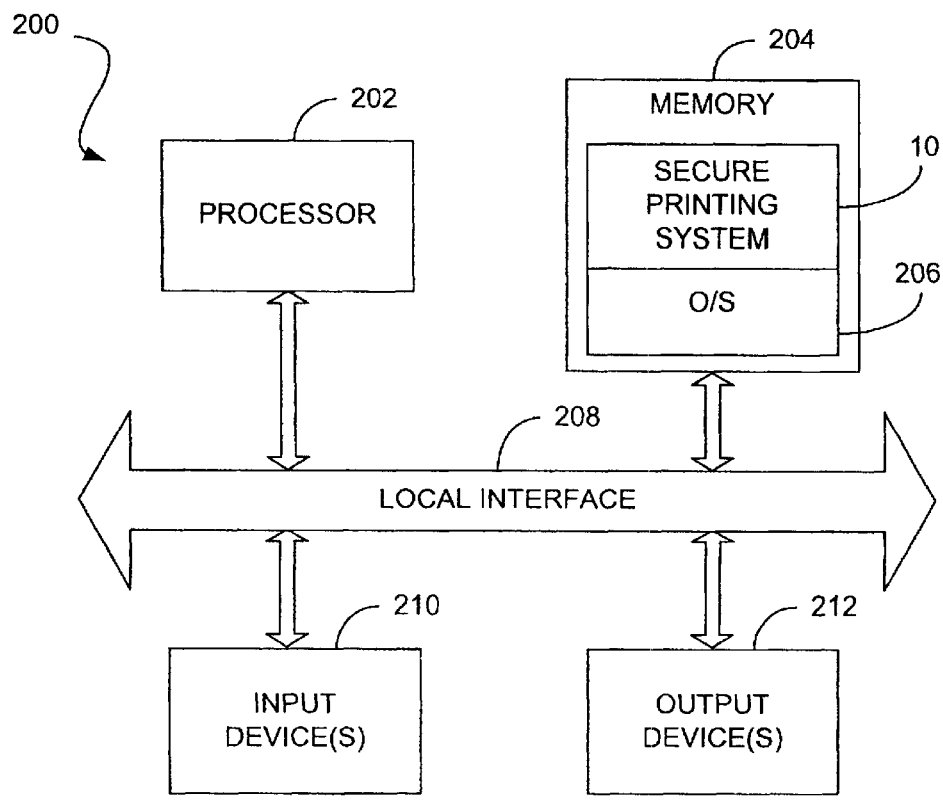
FIG. 2 is a schematic diagram of a computer or processor based system utilized in the present invention.

FIG. 2 illustrates a typical computer or processor-based system 200 which may facilitate the secure printing system 10 of the present invention. As shown in FIG. 2, a computer system 200 generally comprises a processor 202 and a memory 204 with an operating system 206. Herein, the memory 204 may be any combination of volatile and nonvolatile memory elements, such as random access memory or read only memory. The processor 202 accepts instructions and data from memory 204 over a local interface 208, such as a bus(es). The system also includes an input device(s) 210 and an output device(s) 212. Examples of input devices may include, but are not limited to, a serial port, a scanner, or a local access network connection. Examples of output devices may include, but are not limited to, a video display, a Universal Serial Bus, or a printer port. Generally, this system may run any of a number of different platforms and operating systems, including, but not limited to, HP-UX™, Linux™, Unix™, Sun Solaris™ or Windows NT™ operating systems. The secure printing system of the present invention, the functions of which shall be described hereinafter, resides in memory 204 and is executed by the processor 202. It should be noted that one or more processor-based systems, such as one or more of the processor-based systems depicted in FIG. 2, for example, may be utilized to facilitate the functionality described hereinafter, with the one or more processor-based systems being communicatively coupled, e.g., in a network environment, so that the systems may cooperate to provide the various functions.

Figure 3:
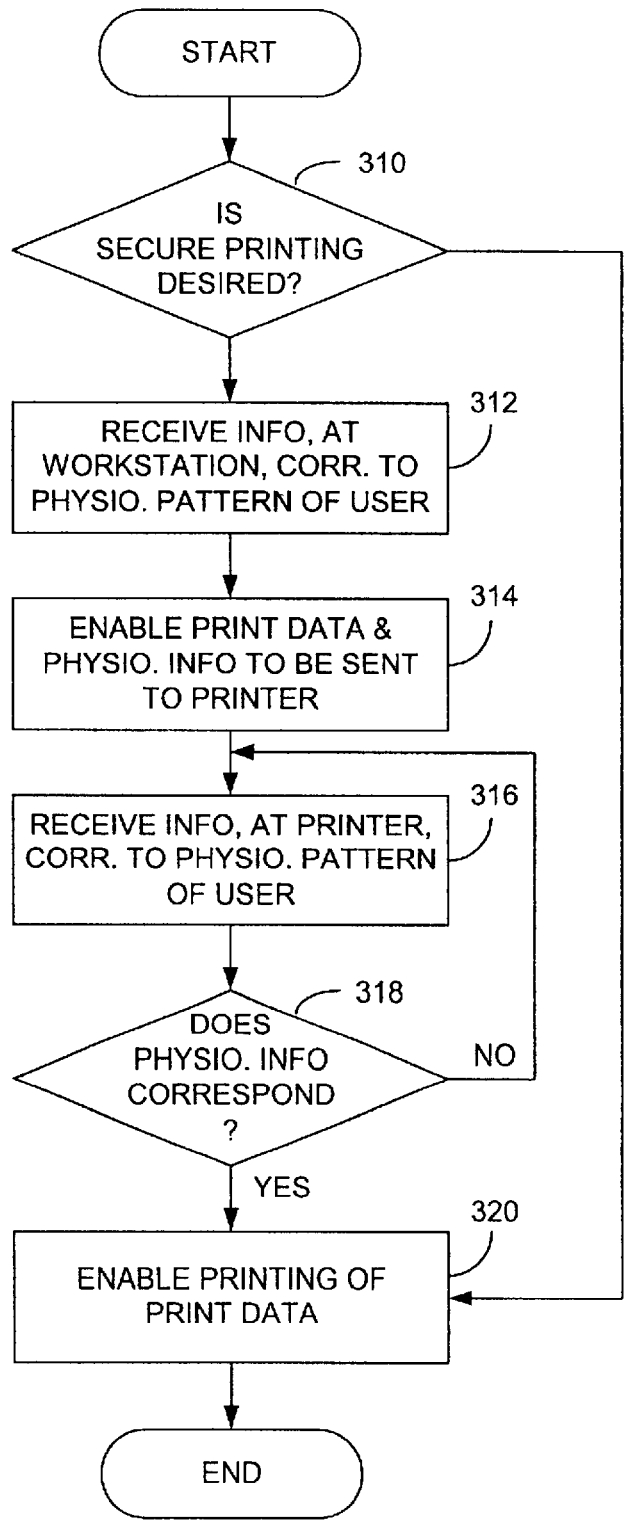
FIG. 3 is a flow chart depicting functionality of a preferred embodiment of the present invention.

The flowchart of FIG. 3 shows the functionality of a preferred implementation of the secure printing system. In this regard, each block of the flowchart represents a module segment or portion of code which comprises one or more executable instructions for implementing the specified logical function or functions. It should also be noted that in some alternative implementations the functions noted in the various blocks may occur out of the order depicted in FIG. 3. For example, two blocks shown in succession in FIG. 3 may, in fact, be executed substantially concurrently where the blocks may sometimes be executed in the reverse order depending upon the functionality involved.

As depicted in FIG. 3, the functionality of a preferred embodiment of the secure printing system may be construed as beginning at block 310 where a determination is made as to whether secure printing is desired. If it is determined that secure printing is desired, the process preferably proceeds to block 312 where user-specific coding information, e.g., physiological pattern information, such as data corresponding to a user's fingerprint, is received at the workstation from which the print function is requested. Proceeding to block 314, the data to be printed and the user-specific coding information is enabled to be sent, e.g., sent to the printer to which the print data is to be printed. Thereafter, such as in block 316, the user-specific coding information, e.g., physiological pattern data, is received by the printer at which the print data is to be printed. Proceeding to block 318, a determination then is made as to whether the user-specific coding information previously received at the workstation corresponds to the user-specific coding information received at the printer. If it is determined that the coding information correspond, the process may proceed to block 320 where the data is printed. However, if it is determined that the coding information do not correspond, the process may return to block 316 so that the user may have at least another opportunity to enter the appropriate user-specific coding information, and then, may proceed as described hereinbefore. It should be noted, however, that in some embodiments, if the user-specific coding information entered at the workstation does not correspond to the user-specific coding information entered at the printer, upon even the first attempt, the process may respond by deleting the data to be printed and/or providing one or more alerts at the printer, workstation or various other locations, thereby enabling identification of a potential printing security breach.

Figure 4:
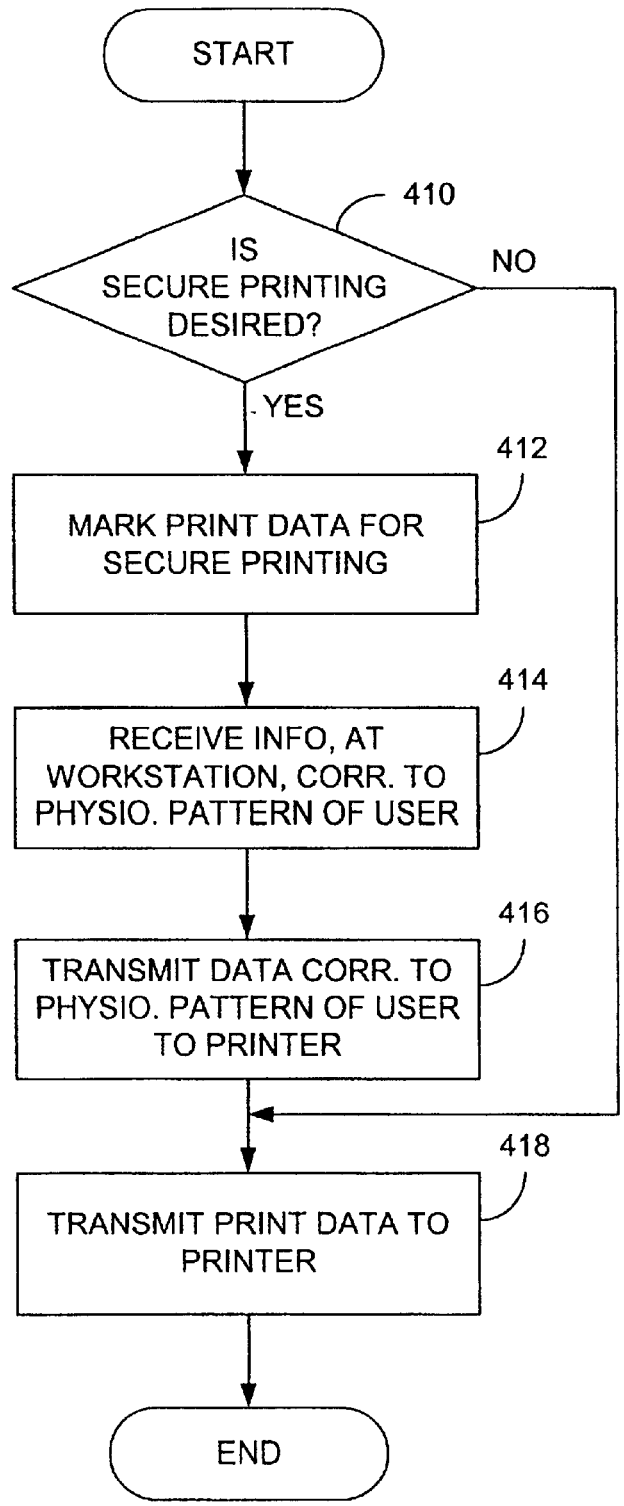
FIG. 4 is a flow chart depicting functionality of a preferred embodiment of the present invention.

Referring to FIG. 4, functionality of a preferred embodiment of the present invention which preferably is implemented at a user workstation, will now be described in detail. In this embodiment, the process preferably begins at block 410 where a determination is made as to whether secure printing is desired. For example, such a determination may be based upon the user actuating an icon on a suitable printer driver user interface, e.g., the interface 500 depicted in FIG. 5. For instance, the user may actuate the "secure" icon 510, thereby enabling a "secure-enable mode." If it is determined that secure printing is not desired, the process may proceed to block 418 (described in detail hereinafter). However, if it is determined that secure printing is desired, the process may proceed to block 412 where data corresponding to the print data is appropriately marked, such as with a flag, for example, for secure printing. The process may then proceed to block 414 where data corresponding to user-specific coding information, e.g., physiological pattern data, is received at the workstation. Receipt of such data may be facilitated by various devices such as a finger print reader, or other appropriate device. In block 416, the data corresponding to the user-specific coding information and the print data (such as depicted in block 418) may be transmitted from the workstation.

Figure 6:
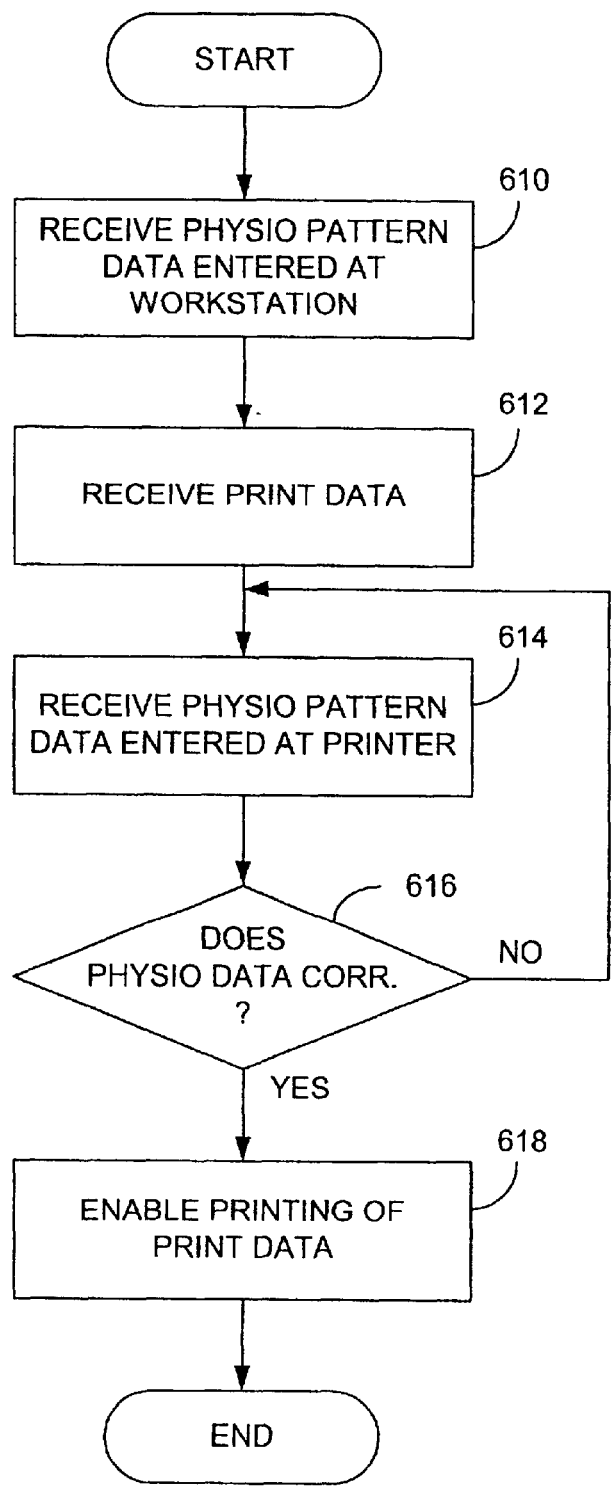
FIG. 6 is a flow chart depicting functionality of a preferred embodiment of the present invention.

Referring now to FIG. 6, preferred functionality of the present invention, which may be implemented at a printer, will now be described in detail. As depicted therein, the process preferably begins at block 610 where data corresponding to the user-specific coding information, e.g., coding information provided at the workstation, is received. At block 612, print data also is received. Proceeding to block 614, data corresponding to user-specific coding information provided at the printer is received. Thereafter, the process may proceed to block 616, where at determination is made as to whether the user-specific coding information entered at the workstation corresponds to the user-specific coding information entered at the printer. If it is determined that the coding information do correspond, the process may proceed to block 616 where the print data may be printed as hard copy. However, if it is determined that the coding information do not correspond, the process may proceed back to block 614; however, in some embodiments, the process may, alternatively, initiate deletion of the print data, actuation of one or more alerts, etc., thereby ensuring the security of the data to be printed.

By utilizing the teachings of the present information, various transactions may be facilitated in a more secure printing environment. For instance, when goods and/or serves are purchased via the internet, a customer may be provided with an "on-line receipt" that is intended to be printed by the customer, so that the customer has a physical representation of the transaction. However, since the transaction may be facilitated by use of a network workstation, public kiosk, etc., that may incorporate printers which do not provide the user with adequate print security, printing of the online receipt in such an environment may make information, such as address, credit card, phone number, passwords, etc., of the customer accessible to others. Thus, by utilizing the teachings of the present invention, the potential for such information being made available to others is reduced as the present invention may ensure that the user is physically available at the printer for retrieving the printed documents at the time of printing.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A printing system for use with a workstation having a first code entry device, the workstation being configured to transmit print data for printing, the first code entry device being configured to receive first coding information from a user, said printing system comprising:

a printer configured to communicatively couple with the workstation and having a second code entry device, said second code entry device being configured to receive second coding information from the user, said printer being configured to print the print data in response to correlating the first coding information received at the first code entry device with said second coding information received at said second code entry device;

a user interface configured to communicate with the workstation, said user interface having a secured-disable mode and a secure-enable mode such that, in said secure-enable mode, the workstation is enabled to receive the first coding information, and in the secure-disable mode, the workstation is enabled to transmit print data to the printer for printing and the printer prints the print data without receiving the first coding information at the first code entry device and without receiving the second coding information at the second code entry device.

2. The printing system of claim 1, wherein the first coding information and said second coding information correspond to physiological pattern information of the user.

3. The printing system of claim 2, wherein each of the first code entry device and said second code entry device is a fingerprint reader configured to generate fingerprint information corresponding to a fingerprint of the user.

4. The printing system of claim 2, wherein each of the first code entry device and said second code entry device comprises means for generating fingerprint information corresponding to a fingerprint of the user.

5. The printing system of claim 1, wherein the first coding information and said second coding information correspond to fingerprint information of the user.

6. The printing system of claim 1, further comprising:

means for enabling the workstation to receive the first coding information.

7. The printing system of claim 1, wherein the secure-enable mode is user selectable via the user interface.

8. The printing system of claim 1, wherein, if the second coding information does not correlate with the first coding information, the printer deletes the print data.

9. A printing security system for use with a workstation and a printer, the workstation being configured to communicatively couple with the printer, the workstation being configured to transmit print data to the printer for printing, said printing security system comprising:

a first code entry device configured to communicatively couple with the workstation, receive first coding information from the user, and provide the first coding information to the workstation; and a second code entry device configured to communicatively couple with the printer, receive second coding information from the user, and provide the second coding information to the printer such that the printer is enabled to print the print data in response to said first coding information received at said first code entry device corresponding to said second coding information received at said second code entry device;

a user interface configured to communicate with the workstation, said user interface having a secure-disable mode and a secure-enable mode such that, said secure-enable mode, the workstation is enabled to receive said first coding information, and in the secure-disable mode, the workstation is enabled to transmit print data to the printer for printing and the printer prints the print data without receiving the first coding information at the first code entry device and without receiving the second coding information at the second code entry device.

10. The printing security system of claim 9, wherein said first coding information and said second coding information correspond to physiological pattern information of the user.

11. The printing security system of claim 10, wherein each of the first code entry device and said second code entry device is a fingerprint reader configured to generate fingerprint information corresponding to a fingerprint of the user.

12. The printing security system of claim 10, wherein each of said first code entry device and said second code entry device comprises means for generating fingerprint information corresponding to a fingerprint of the user.

13. The printing security system of claim 9, wherein said first coding information and said second coding information correspond to fingerprint information of the user.

14. The printing security system of claim 9, further comprising:

means for enabling the workstation to receive the first coding information.

15. The printing system of claim 9, wherein, if the second coding information does not correlate with the first coding information, the printer deletes the print data.

16. A method for providing secure printing between a workstation and a printer, the workstation being configured to transmit print data to the printer for printing, said method comprising the steps of:

when operating in a secure-enable mode:
receiving first coding information, at the workstation, from a user;
enabling print data and the first coding information to be transmitted to the printer;
receiving second coding information, at the printer, from the user;
comparing the first coding information with the second coding information such that if the first coding information corresponds to the second coding information, enabling printing of the print data at the printer, and if the first coding information does not correspond to the second coding information, not enabling printing of the print data at the printer; and when operating in a secure-disable mode:
enabling print data to be transmitted to the printer; and
enabling printing of the print data at the printer without receiving the first coding information at the first code entry device and without receiving the second coding information at the second coding device.

17. The method of claim 16, wherein the step of receiving first coding information comprises:

providing a first code entry device configured to communicatively couple with the workstation;
receiving the first coding information, at the first code entry device, from the user; and
providing the first coding information from the first code entry device to the workstation.

18. The method of claim 16, wherein the step of receiving second coding information comprises:

providing a second code entry device configured to communicatively couple with the printer;
receiving the second coding information, at the second code entry device, from the user; and
providing the first coding information from the second code entry device to the printer.

19. The method of claim 16, wherein the first coding information and the second coding information correspond to physiological pattern information of the user.

20. the method of claim 16, further comprising:

deleting the print data if the first coding information does not correspond to the second coding information.

21. A computer readable medium having a computer program for providing secure printing between a workstation and a printer, the workstation being configured to transmit print data to the printer for printing, said computer readable medium comprising:

logic configured to receive first coding information, at the workstation, from a user;
logic configured to receive second coding information, provided at the printer, from the user;
logic configured to compare the first coding information with the second coding information; and
logic configured to enable printing of the print data at the printer if the first coding information corresponds to the second coding information wherein the logic configured to receive first coding information comprises:

a first code segment configured to provide a user interface at the workstation, the user interface having a secure-disable mode and a secure-enable mode such that, in the secure-enable mode, the workstation is enabled to receive the first coding information, and in the secure-disable mode, the workstation is enabled to transmit print data to the printer for printing and the printer prints the print data without receiving the first coding information at the first code entry device and without receiving the second coding information at the second code entry device.

22. The computer readable medium of claim 21, further comprising:

logic configured to delete the print data if the first coding does not correspond to the second coding information.

* * * * *

UNITED STATES PATENT AND TRADEMARK OFFICE
CERTIFICATE OF CORRECTION

| | |
|---|---|
| PATENT NO. | : 7,120,605 B2 |
| APPLICATION NO. | : 09/728045 |
| DATED | : October 10, 2006 |
| INVENTOR(S) | : Gustavo M. Guillemin et al. |

Page 1 of 1

It is certified that error appears in the above-identified patent and that said Letters Patent is hereby corrected as shown below:

In column 8, line 23, in Claim 20, delete "the" and insert -- The --, therefor.

Signed and Sealed this

Twenty-third Day of December, 2008

JON W. DUDAS
*Director of the United States Patent and Trademark Office*